(12) United States Patent
Sakaue et al.

(10) Patent No.: US 10,558,312 B2
(45) Date of Patent: Feb. 11, 2020

(54) TOUCH PANEL

(71) Applicant: JAPAN AVIATION ELECTRONICS INDUSTRY, LIMITED, Tokyo (JP)

(72) Inventors: Akitoshi Sakaue, Tokyo (JP); Kenji Matsumoto, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 16/148,188

(22) Filed: Oct. 1, 2018

(65) Prior Publication Data

US 2019/0114006 A1    Apr. 18, 2019

(30) Foreign Application Priority Data

Oct. 16, 2017   (JP) .................................. 2017-200068
Feb. 1, 2018    (JP) .................................. 2018-016455

(51) Int. Cl.
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC . G06F 2203/04103; G06F 2203/04112; G06F 3/044; G06F 3/0445; G06F 3/0446; G06F 3/0448
USPC .................................................. 345/170–178
See application file for complete search history.

(56) References Cited

U.S. PATENT DOCUMENTS

| 2017/0221196 A1 | 8/2017 | Yamaguchi et al. |
| 2018/0279488 A1 | 9/2018 | Kogawa et al. |
| 2019/0114006 A1* | 4/2019 | Sakaue ................... G06F 3/044 |
| 2019/0121466 A1* | 4/2019 | Sakaue ................ G06F 3/0445 |

FOREIGN PATENT DOCUMENTS

| JP | 2017-103317 A | 6/2017 |
| JP | 2017103318 A | 6/2017 |
| KR | 20130084778 A | 7/2013 |
| KR | 20150046636 A | 4/2015 |
| KR | 20170058402 A | 5/2017 |

OTHER PUBLICATIONS

U.S. Appl. No. 16/149,323 to Akitoshi Sakaue, filed Oct. 2, 2018.
U.S. Appl. No. 16/173,379 to Akitoshi Sakaue et al., filed Oct. 29, 2018.
Office Action issued in Korean family member 10-2018-0116742 dated Sep. 30, 2019, together with an English-language translation.

* cited by examiner

*Primary Examiner* — Tony O Davis
(74) *Attorney, Agent, or Firm* — Greenblum & Bernstein, P.L.C.

(57) ABSTRACT

In a touch panel having a structure in which a first layer in which a first sensor electrode in the form of a mesh of fine lines is formed and a second layer in which a second sensor electrode in the form a mesh of fine lines is formed are overlaid on one another with a transparent insulator between them, a first dummy wiring that constitutes a first mesh pattern with the first sensor electrode is formed in the first layer and a second dummy wiring that constitutes a second mesh pattern with the second sensor electrode is formed in the second layer. The first mesh pattern and the second mesh pattern are identical to each other in a pair of tiling periodicity directions and translational periods corresponding thereto.

18 Claims, 13 Drawing Sheets

TOUCH PANEL

TECHNICAL FIELD

The present invention relates to a touch panel in which sensor electrodes that detect a touch location are made of a mesh of fine lines.

BACKGROUND ART

Figure 1:
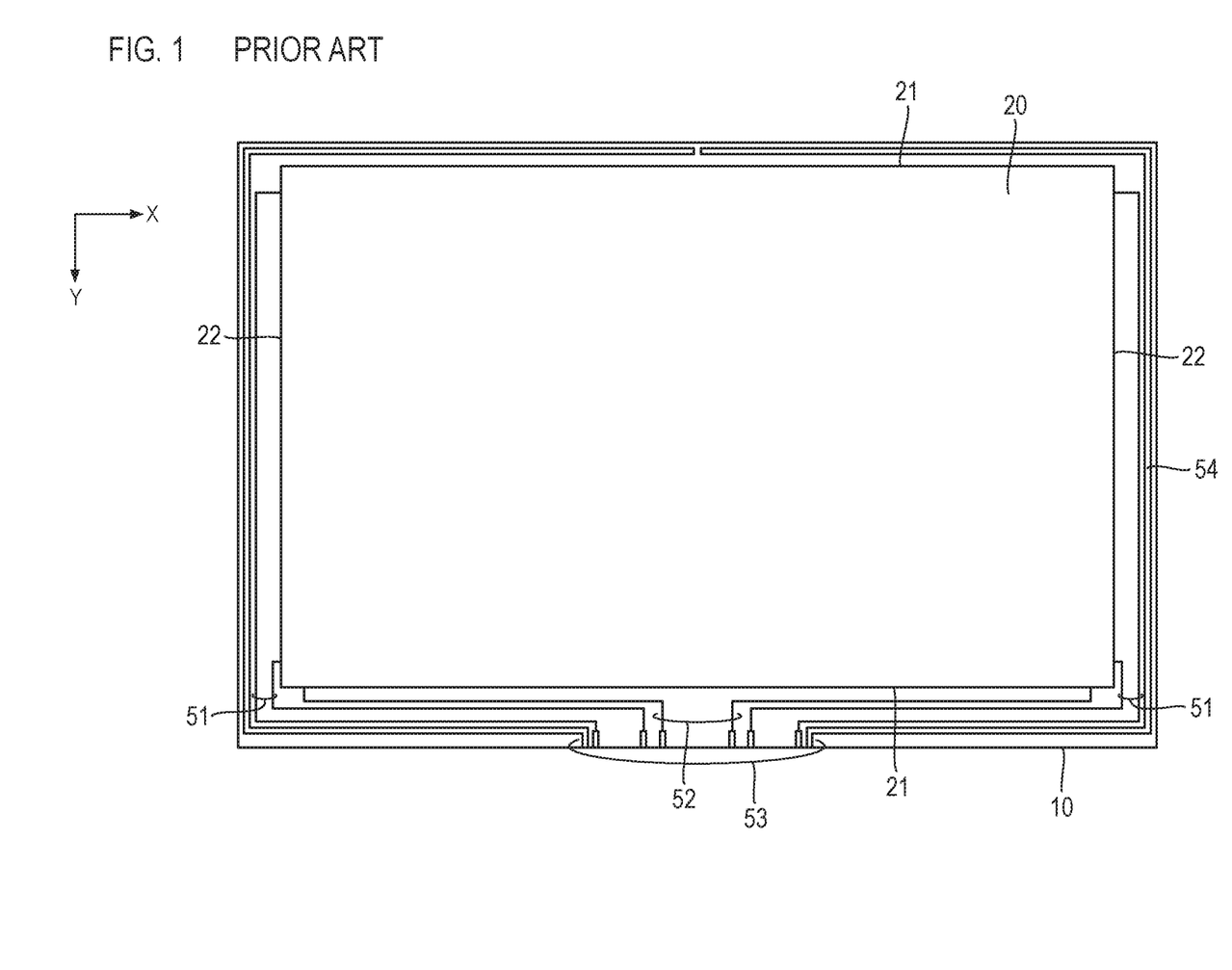
FIG. 1 is a diagram illustrating an example configuration of a touch panel.
Figure 2A:
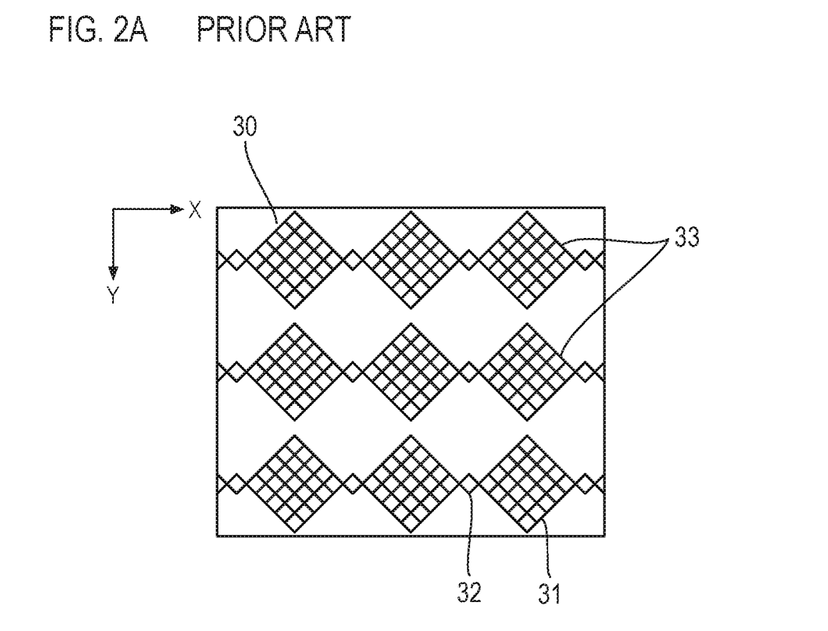
FIG. 2A is a partial enlarged view illustrating an example conventional configuration of a first conductor layer of a touch panel.
Figure 2B:
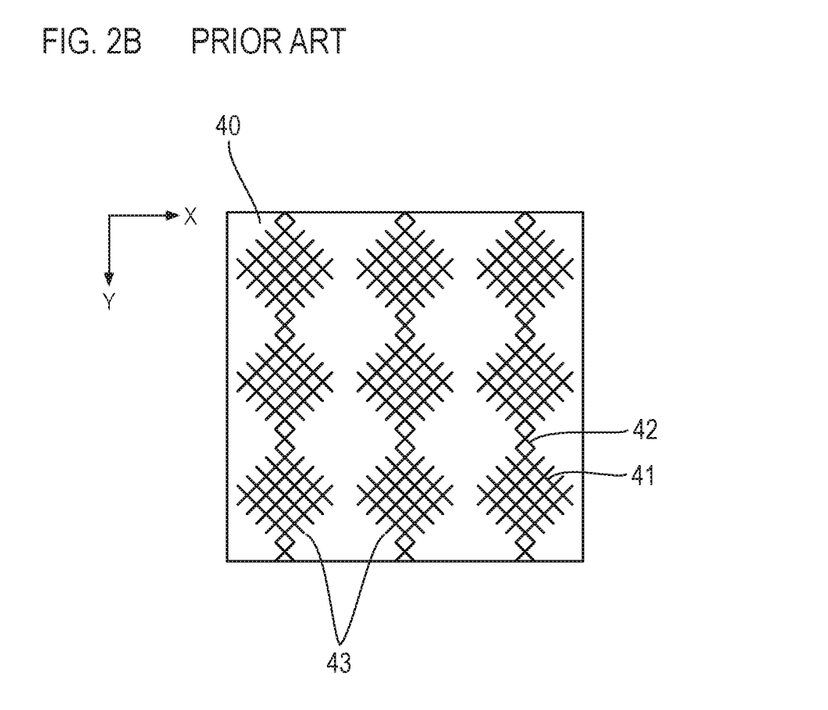
FIG. 2B is a partial enlarged view illustrating an example conventional configuration of a second conductor layer of a touch panel.

FIGS. 1, 2A and 2B illustrate a configuration of a capacitive touch panel described in Japanese Patent Application Laid Open No. 2017-103317 (published on Jun. 8, 2017) as an example of conventional touch panels of this type. The touch panel comprises a first conductor layer, an insulating layer, a second conductor layer, and a protective coating which are stacked in this order on a transparent substrate 10. An area enclosed in a rectangular frame in FIG. 1 is a sensor region 20 in which sensor electrodes are located. Details of the sensor electrodes are omitted from FIG. 1.

The sensor electrodes include first and second sensor electrodes. The first sensor electrode is formed in a first conductor layer and the second sensor electrode is formed in a second conductor layer.

As illustrated in FIG. 2A, the first sensor electrode 30 comprises a plurality of electrode rows 33 parallelly arranged in a Y direction parallel to the short side 22 of the sensor region 20, where each of the electrode rows 33 is made up of a plurality of island-like electrodes 31 arranged in a X direction parallel to the long side 21 of the sensor region 20 and linked with one another through linkage parts 32.

As illustrated in FIG. 2B, the second sensor electrode 40 comprises a plurality of electrode rows 43 parallelly arranged in the X direction, where each of the electrode rows 43 is made up of a plurality of island-like electrodes 41 arranged in the Y direction and linked with one another through linkage parts 42.

Each of the first sensor electrode 30 and the second sensor electrode 40 is formed of a mesh of fine lines, the electrode rows 33 and the electrode rows 43 intersect each other and are insulated from each other, and the linkage parts 32 and 42 are positioned in locations that coincide with each other.

Second leads 51 are extended from both ends of each electrode row 33 of the first sensor electrode 30 in the X direction and first leads 52 are extended from one end of each electrode row 43 of the second sensor electrode 40 in the Y direction. The first leads 52 and the second leads 51 each arranged in an array and extended from the sensor region 20 other than the first and second leads 52, 51 at both ends of each array are omitted from FIG. 1.

Terminal parts 53 are arranged and formed in a center portion of one of the long sides of the rectangular transparent substrate 10 and the first and second leads 52, 51 extend and are connected to each terminal part 53. Ground wirings 54 formed around the transparent substrate 10 to enclose the sensor region 20, the first leads 52 and the second leads 51 are also connected to the terminal parts 53.

The first leads 52, the second leads 51 and the terminal parts 53 are formed in the first conductor layer and the ground wirings 54 are formed in both of the first and second conductor layers.

The first and second conductor layers which have the configuration described above are formed by gravure offset printing using conductive ink containing conductive particles such as silver particles in this example.

SUMMARY OF THE INVENTION

When an electrode pattern and a wiring pattern in a touch panel are formed by printing using conductive ink containing conductive particles such as silver particles, it is important to make sensor electrodes disposed in a sensor region have high transparency and difficult to visually recognize so as not to impair the visibility of a display part in which the touch panel is placed. For this reason, sensor electrodes formed by printing using conductive ink are typically in the form of a mesh of fine lines as in the touch panel described above.

On the other hand, sensor electrodes even in the form of a mesh of fine lines inevitably bring contrast between a region where the mesh of fine lines exists and a region where the mesh of fine lines does not exist and the contrast has no small influence on the visibility of the display part.

In that respect, the first sensor electrode 30 and the second sensor electrode 40 in the touch panel described above are configured in such a way that the linkage parts 32 and 42 are positioned in locations that coincide with each other and the electrode rows 33 and electrode rows 43 intersect each other, that is, the island-like electrodes 41 in the second conductor layer are disposed in locations where the mesh of fine lines does not exist in the first conductor layer so as to fill the locations. Accordingly, contrast produced in the first conductor layer and contrast produced in the second conductor layer cancel each other out, thereby reducing contrast in the sensor region.

However, because the insulating layer exists between the first conductor layer and the second conductor layer, the visual contrast in the second conductor layer and the visual contrast in the first conductor layer viewed through the insulating layer are not equal. The contrast in the sensor region of the conventional touch panel has therefore not completely been eliminated.

In light of these circumstances, an object of the present invention is to provide a touch panel that enables contrast in a sensor region to be completely eliminated and thus has good quality without adverse visual influence on a display part.

According to the present invention, a touch panel comprises a first sensor electrode in a form of a mesh of fine lines formed in a first layer, a first dummy wiring in a form of a mesh of fine lines formed in a region in the first layer other than a region in which the first sensor electrode is formed, the first dummy wiring being insulated from the first sensor electrode, a second sensor electrode in a form of a mesh of fine lines formed in a second layer, and a second dummy wiring in a form of a mesh of fine lines formed in a region in the second layer other than a region in which the second sensor electrode is formed, the second dummy wiring being insulated from the second sensor electrode, wherein the first layer and the second layer are overlaid on one another with a transparent insulator disposed between the first layer and the second layer, the first sensor electrode and the first dummy wiring, being disposed so that a first gap is formed therebetween, constitute a first mesh pattern, the first mesh pattern being a single continuous periodic mesh pattern, such that a fine line included by the first mesh pattern is interrupted at a place where the fine line included by the first mesh pattern intersects with the first gap, the second sensor electrode and the second dummy wiring, being disposed so that a second gap is formed therebetween, constitute a second mesh pattern, the second mesh pattern being a single continuous periodic mesh pattern, such that a fine line included by the second mesh pattern is interrupted at a place where the fine line included by the second mesh pattern intersects with the second gap, each of the first mesh pattern and the second mesh pattern is a grid pattern that is obtained by a tessellation of a plane using a unit cell of one type as a tile in accordance with a pair of tiling periodicity directions, the pair of tiling periodicity directions being nonparallel to each other, such that each of the pair of tiling periodicity directions defines a direction in which a translational period of the unit cell corresponding to the tiling periodicity direction occurs, the first mesh pattern and the second mesh pattern are identical to each other in the pair of tiling periodicity directions and the translational periods corresponding thereto, and the first mesh pattern and the second mesh pattern are aligned with each other and overlaid on each other in such a way that the first mesh pattern and the second mesh pattern are deviated from each other in both of the pair of tiling periodicity directions, respectively by from ¼ to ¾, inclusive, of the translational period corresponding to the tiling periodicity direction.

In the touch panel according to the present invention, visual contrast which would be caused by the presence and absence of the mesh of fine lines does not occur in the first layer in which the first sensor electrode is formed and the second layer in which the second sensor electrode is formed, and therefore contrast in the sensor region can be completely eliminated, whereby a good-quality of the touch panel without impairment of visibility of a display part can be stably achieved.

DETAILED DESCRIPTION OF THE EMBODIMENTS

Example embodiments of the present invention will be described below.

Figure 3:
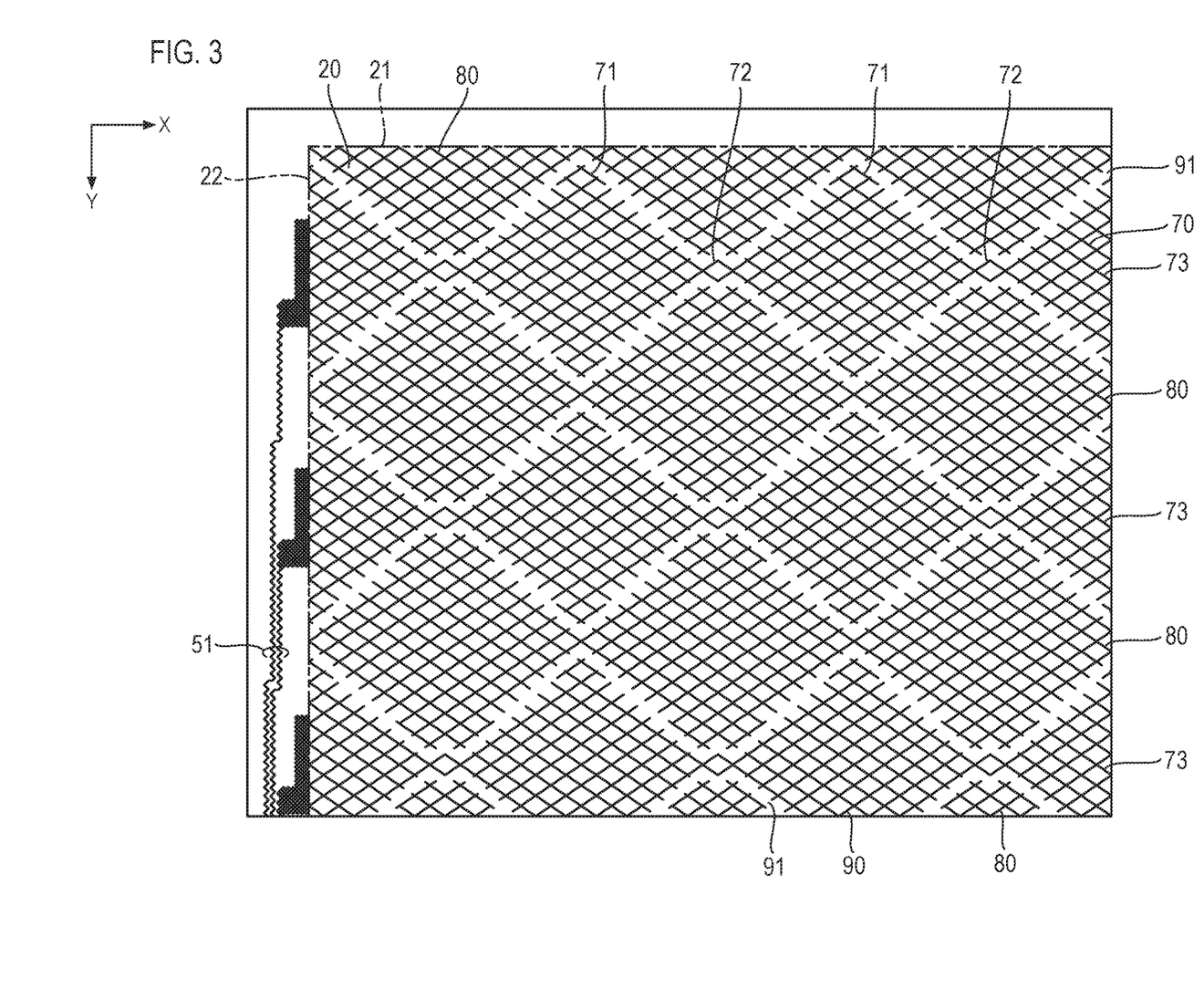
FIG. 3 is a partial enlarged view illustrating a mesh pattern of a first layer in an example embodiment of a touch panel according to the present invention.
Figure 4:
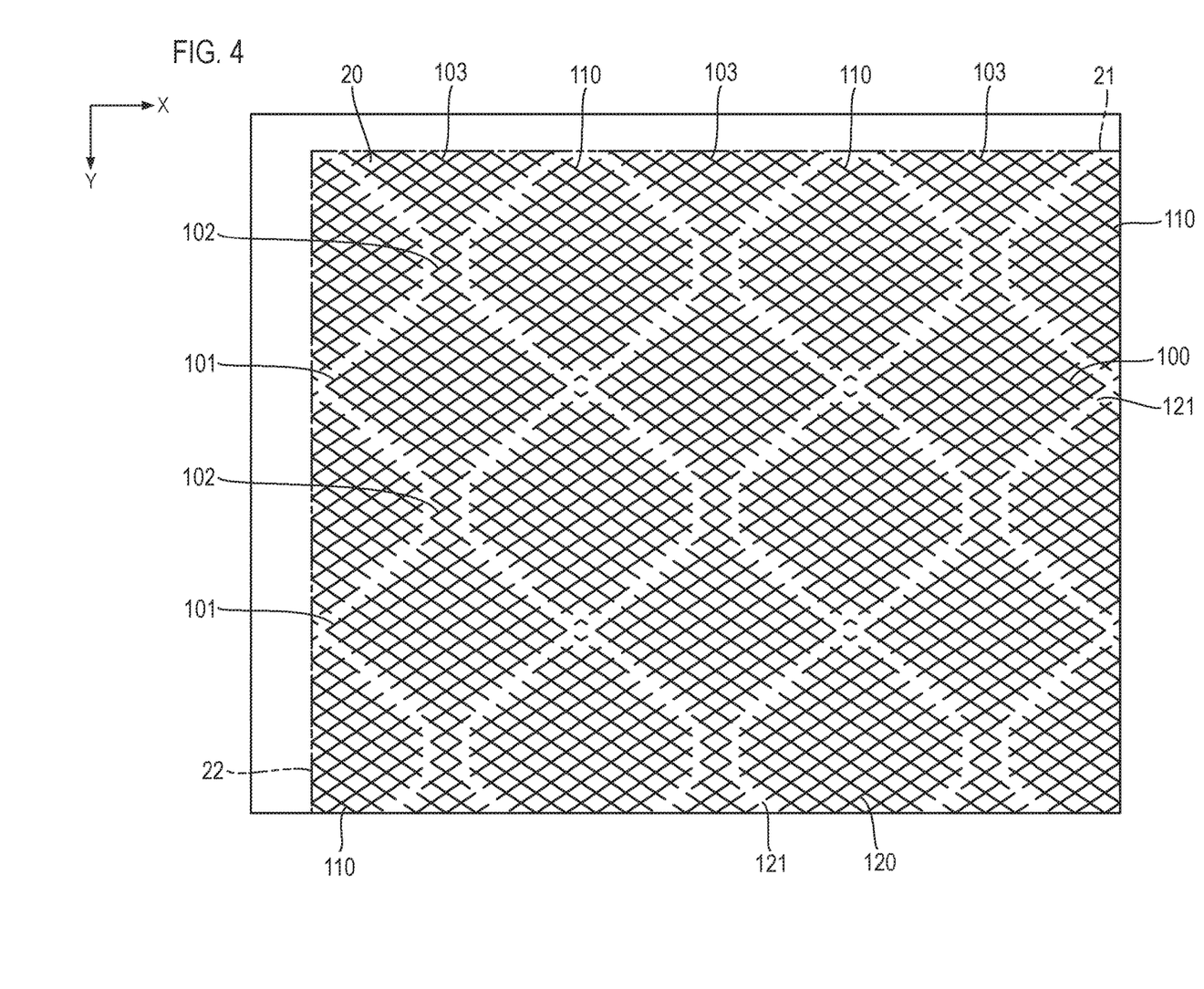
FIG. 4 is a partial enlarged view illustrating a mesh pattern of a second layer in an example embodiment of a touch panel according to the present invention.
Figure 5:
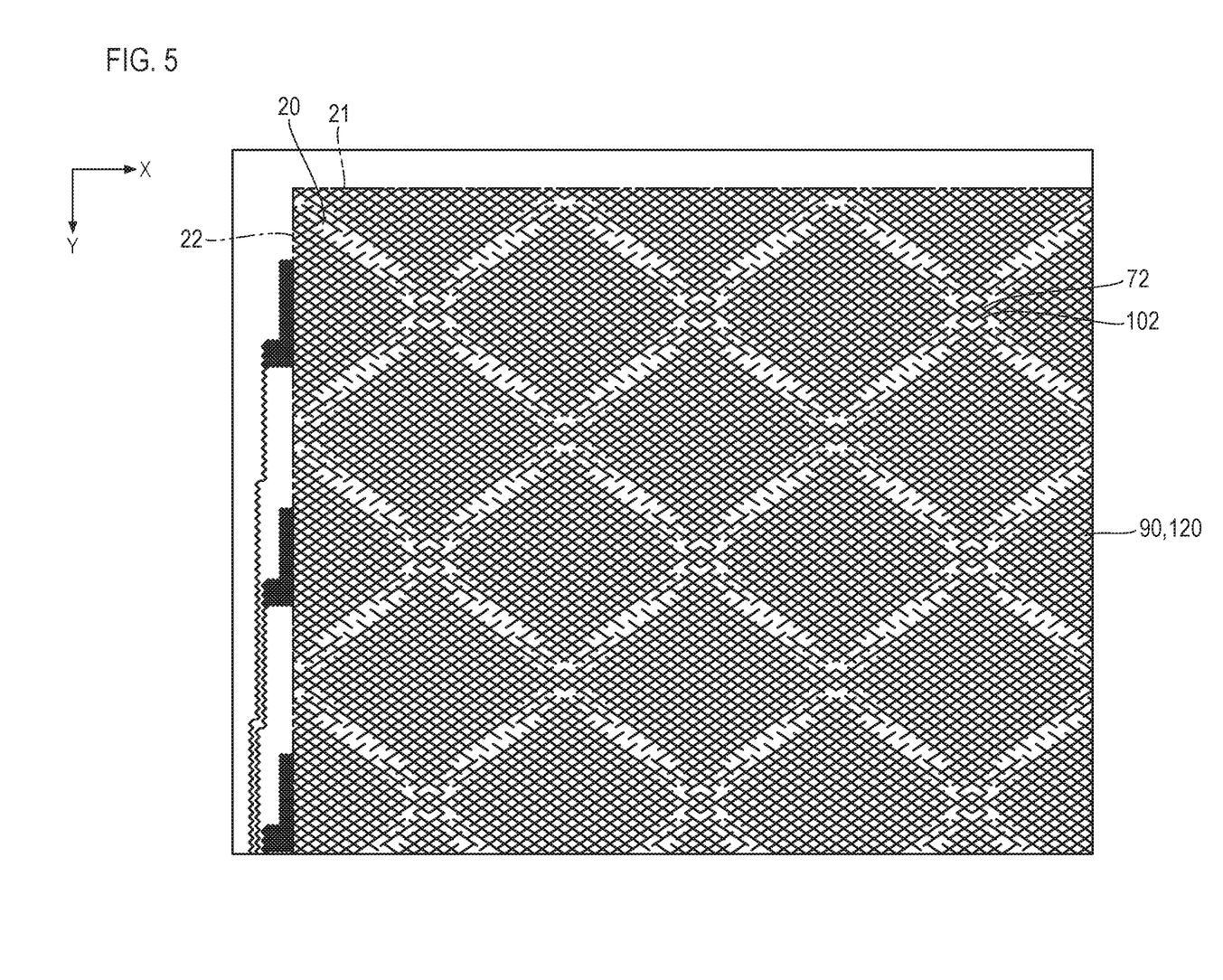
FIG. 5 is a partial enlarged view illustrating the mesh patterns illustrated in FIGS. 3 and 4 overlaid on one another.
Figure 6A:
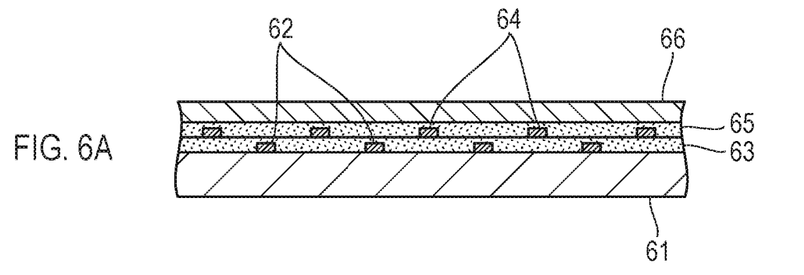
FIG. 6A is a diagram illustrating a cross-section of a portion of one example embodiment of a touch panel according to the present invention.

FIGS. 3 to 5 illustrate details of a main part of a configuration of an example embodiment of a touch panel according to the present invention and FIG. 6A illustrates a cross-section of a portion of the touch panel illustrated in FIGS. 3 to 5.

The touch panel in this example has a configuration in which a first layer 62, an insulating layer 63, a second layer 64, and a protective coating 65 are stacked in this order on one side of a transparent substrate 61, and a cover film 66 is provided on the protective coating 65. The first layer 62 and the second layer 64 are conductors. The insulating layer 63, the protective coating 65, and the cover film 66 are made of transparent materials and the first layer 62 and the second layer 64 are formed by printing using conductive ink containing conductive particles such as silver particles. It should be noted that the touch panel differs from the example conventional touch panel in terms of the configuration of the sensor region 20, and the configuration other than the sensor region 20 is basically identical to the configuration illustrated in FIG. 1. FIGS. 3 to 5 illustrate details of a portion corresponding to the upper left corner in FIG. 1.

FIG. 3 illustrates details of printed wirings of the first layer 62. A first sensor electrode 70 and a first dummy wiring 80 are formed in the sensor region 20. The first sensor electrode 70 comprises a plurality of electrode rows 73 parallelley arranged in the Y direction, where each of the electrode rows 73 is made up of a plurality of island-like electrodes 71 arranged in the X direction and linked with one another through linkage parts 72. The first dummy wiring 80 is formed in a region in the sensor region 20 other than a region in which the first sensor electrode 70 is formed and is insulated from the first sensor electrode 70.

Both of the first sensor electrode 70 and the first dummy wiring 80 are formed of meshes of fine lines. The first sensor electrode 70 and the first dummy wiring 80, being disposed so that a first gap 91 is formed therebetween, constitute a first mesh pattern 90 which is a single continuous periodic mesh pattern. A fine line included by the first mesh pattern 90 is interrupted at a place where the fine line intersects with the first gap 91. A unit cell of the first mesh pattern 90 in this example is in the shape of a rhombus with a side length of 400 μm and the width of each of the fine lines making up the mesh is 7 μm. The first gap 91 that insulates between the first sensor electrode 70 and the first dummy wiring 80 are approximately 20 μm. Note that the first gap 91 is depicted relatively enlarged in FIG. 3.

FIG. 4, on the other hand, illustrates details of printed wirings of the second layer 64. A second sensor electrode 100 and a second dummy wiring 110 are formed in the sensor region 20. The second sensor electrode 100 comprises a plurality of electrode rows 103 parallelly arranged in the X direction, where each of the electrode rows 103 is made up of a plurality of island-like electrodes 101 arranged in the Y direction and linked with one another through linkage parts 102. The second dummy wiring 110 is formed in a region in the sensor region 20 other than a region in which the second sensor electrode 100 is formed and is insulated from the second sensor electrode 100.

Both of the second sensor electrode 100 and the second dummy wiring 110 are formed of meshes of fine lines. The second sensor electrode 100 and the second dummy wiring 110, being disposed so that a second gap 121 is formed therebetween, constitute a second mesh pattern 120 which is a single continuous periodic mesh pattern. A fine line included by the second mesh pattern 120 is interrupted at a place where the fine line intersects with the second gap 121. The second mesh pattern 120 in this example is identical to the first mesh pattern 90 and the angle which each of the fine lines making up the mesh forms with the long side 21 of the sensor region 20 is also identical to that in the first mesh pattern 90. Note that the second gap 121 is depicted relatively enlarged as in FIG. 3.

FIG. 5 illustrates the printed wirings of the first layer 62 illustrated in FIG. 3 and the printed wirings of the second layer 64 illustrated in FIG. 4 which are overlaid on one another with the insulating layer 63 between them. The first mesh pattern 90 of the first layer 62 and the second mesh pattern 120 of the second layer 64 are overlaid on each other in such a way that they intersect at the midpoint that divides a side of the rhombus shape of each unit cell into two 200 μm segments. Consequently, rhombus-shaped cells with a side length of 200 μm are highly uniformly formed in the entire sensor region 20 as illustrated in FIG. 5. It should be noted that the electrode rows 73 of the first sensor electrode 70 and the electrode rows 103 of the second sensor electrode 100 intersect, with the linkage parts 72 and 102 being positioned in locations that coincide with each other.

As described above, in the present example, the first mesh pattern 90 uniformly exists in the sensor region 20 of the first layer 62 in which the first sensor electrode 70 is formed, and the second mesh pattern 120 uniformly exists in the sensor region 20 of the second layer 64 in which the second sensor electrode 100 is formed. Accordingly, visual contrast due to the presence and absence of the mesh of fine lines does not occur in each of the first layer 62 and the second layer 64 and naturally visual contrast does not occur when the first layer 62 and the second layer 64 are overlaid on each other, whereby contrast in the sensor region 20 can be completely eliminated. Therefore, there is no visual influence on the display part and a touch panel with excellent viewability and good quality can be achieved.

Note that since the first mesh pattern 90 and the second mesh pattern 120 are overlaid on each other in such a way that they intersect at the midpoint that divides each side of the rhombus shape of each unit cell into two 200 μm segments as described above, the fine lines that constitute the first mesh pattern 90 and the fine lines that constitute the second mesh pattern 120 are not close to each other. Therefore, a pair of adjacent fine lines do not appear as a visible, relatively dark line as if they were a single thick line.

Figure 6B:
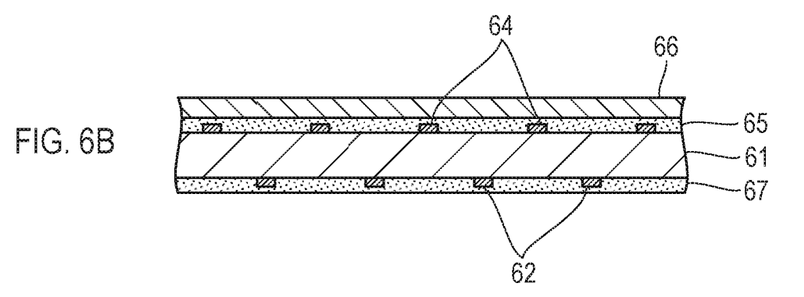
FIG. 6B is a diagram illustrating a cross-section of a portion of another example embodiment of a touch panel according to the present invention.

While the printed wirings of the first layer 62 and the printed wirings of the second layer 64 are formed on one side of the substrate 61 with the insulating layer 63 between them, the printed wirings of the first layer 62 and the printed wirings of the second layer 64 may be formed on one side and the other side of the substrate 61, respectively. FIG. 6B illustrates this configuration, where elements that are equivalent to elements in FIG. 6A are given the same reference numerals. In FIG. 6B, reference numeral 67 indicates a protective coating. The substrate 61 is made of an insulator.

The first mesh pattern formed in the first layer 62 in which the first sensor electrode 70 is formed and the second mesh pattern formed in the second layer 64 in which the second sensor electrode 100 is formed will now be described in further detail.

Each of the first mesh pattern and the second mesh pattern is a grid pattern that is obtained by a tessellation of a plane using a unit cell of one type as a tile in accordance with a pair of tiling periodicity directions. The pair of tiling periodicity directions are nonparallel to each other. Each of the pair of tiling periodicity directions defines a direction in which a translational period of the unit cell corresponding to the tiling periodicity directions occurs. The first mesh pattern and the second mesh pattern are identical to each other in the pair of tiling periodicity directions and the translational periods corresponding thereto.

The first mesh pattern and the second mesh pattern are aligned with each other and overlaid on each other with a predetermined deviation from perfect alignment. In the example described above, the first mesh pattern and the second mesh pattern have the unit cell that has the shape of a rhombus with a side length of 400 μm, and the first mesh pattern and the second mesh pattern are overlaid on each other in such a way that they intersect at the midpoint that divides each side of the rhombus shape into two 200 μm sections. That is, the first mesh pattern and the second mesh pattern are aligned with each other and overlaid on each other in such a way that the first mesh pattern and the second mesh pattern are deviated from each other in both of the pair of tiling periodicity directions, respectively by ½ of the translational period corresponding to the tiling periodicity direction. This isolates the fine lines making up the first mesh pattern and the fine lines making up the second mesh pattern away from one another with a maximum gap and allows rhombus shapes with a side length of 200 μm to be uniformly formed when they are overlaid on one another. When overlaying the first mesh pattern and the second mesh pattern on each other, the first mesh pattern and the second mesh pattern need only to be aligned in such a way that the first mesh pattern and second mesh pattern are deviated from each other in both of the pair of tiling periodicity directions, respectively by from ¼ to ¾, inclusive, of the translational period corresponding to the tiling periodicity direction. This can well avoid closeness between fine lines due to the overlaying.

While the unit cell is the rhombus shape in the example described above, the shape of the unit cell is not limited to this and any of a wide variety of shapes can be employed. For example, the shape of the unit cell may be a square or a regular hexagon. The relative angle between the pair of tiling periodicity directions of these grid patterns is 90° for the square and 60° for the regular hexagon. The translational period is equal to the distance between parallel opposed sides (in the case of the square, the side length of the square).

Figure 7A:
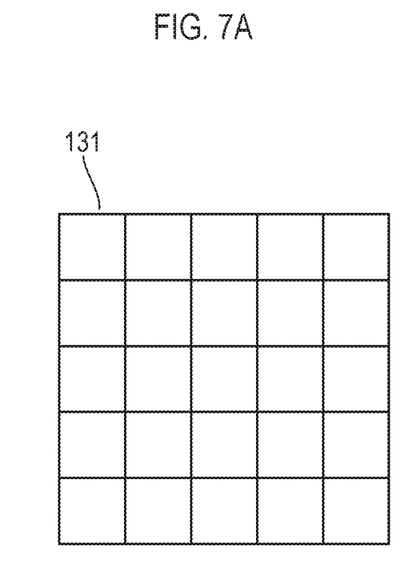
FIG. 7A is a diagram illustrating a grid pattern having square unit cells.
Figure 7B:
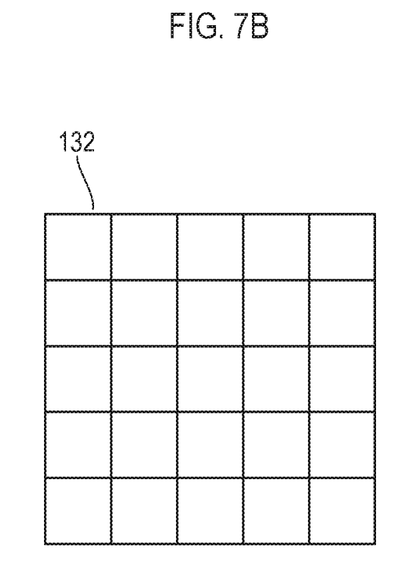
FIG. 7B is a diagram illustrating a grid pattern similar to the grid pattern illustrated in FIG. 7A and to be overlaid on the grid pattern in FIG. 7A.
Figure 7C:
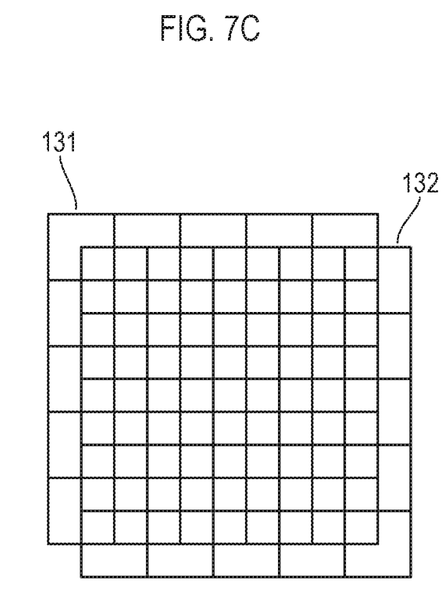
FIG. 7C is a diagram illustrating the grid patterns illustrated in FIGS. 7A and 7B overlaid on one another.

FIGS. 7A and 7B illustrate grid patterns 131, 132, respectively, with square unit cells. FIG. 7C illustrates the grid patterns 131, 132 aligned with each other and overlaid on each other in such a way that the grid pattern 131 and the grid pattern 132 are deviated from each other in both of the pair of tiling periodicity directions, respectively by ½ of the translational period corresponding to the tiling periodicity direction.

Figure 8A:
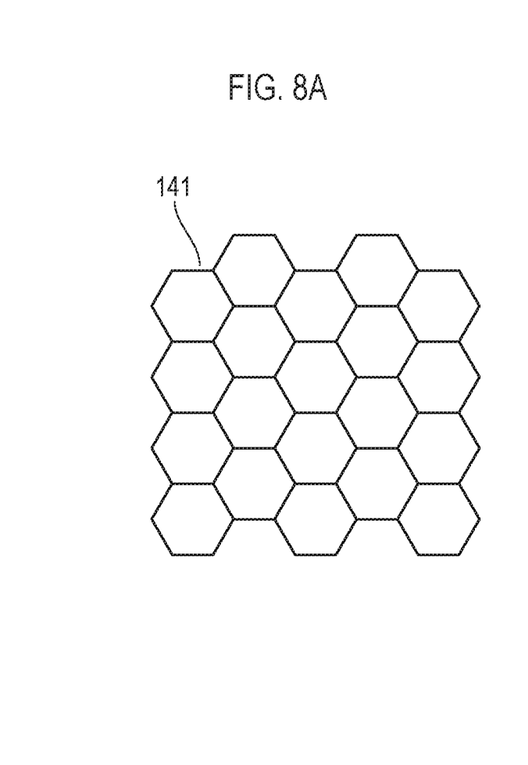
FIG. 8A is a diagram illustrating a grid pattern having regular-hexagonal unit cells.
Figure 8B:
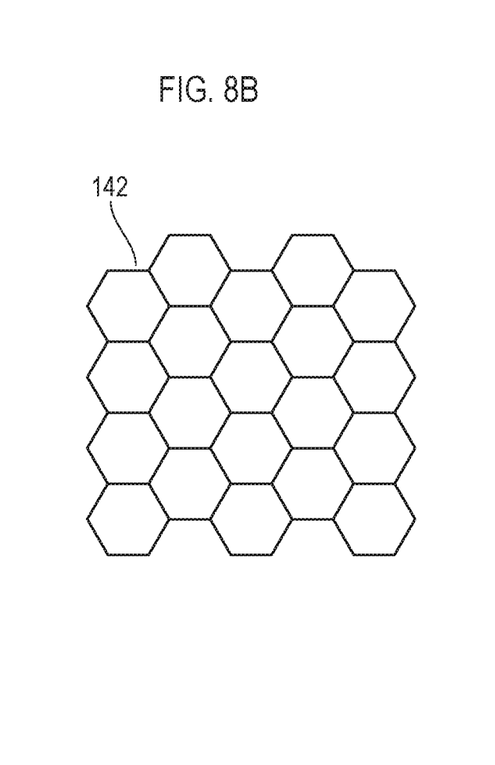
FIG. 8B is a diagram illustrating a grid pattern similar to the grid pattern illustrated in FIG. 8A and to be overlaid on the grid pattern in FIG. 8A.
Figure 8C:
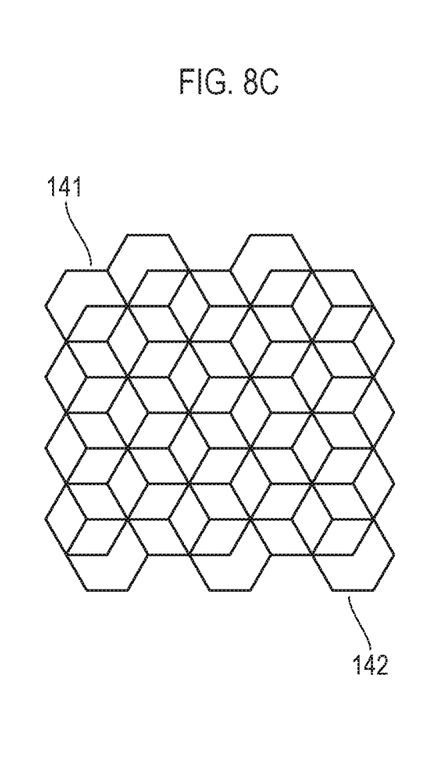
FIG. 8C is a diagram illustrating the grid patterns illustrated in FIGS. 8A and 8B overlaid on one another.

FIGS. 8A and 8B illustrate grid patterns 141, 142, respectively, with regular-hexagonal unit cells. FIG. 8C illustrates the grid patterns 141, 142 aligned with each other and overlaid on each other in such a way that the grid pattern 141 and the grid pattern 142 are deviated from each other in both of the pair of tiling periodicity directions, respectively by ½ of the translational period corresponding to the tiling periodicity direction.

Further, the unit cell may have the shape of a rectangle or a parallelogram, or a hexagon that is enclosed with three pairs of opposite sides parallel to each other but with different distances between opposite sides.

Figure 9:
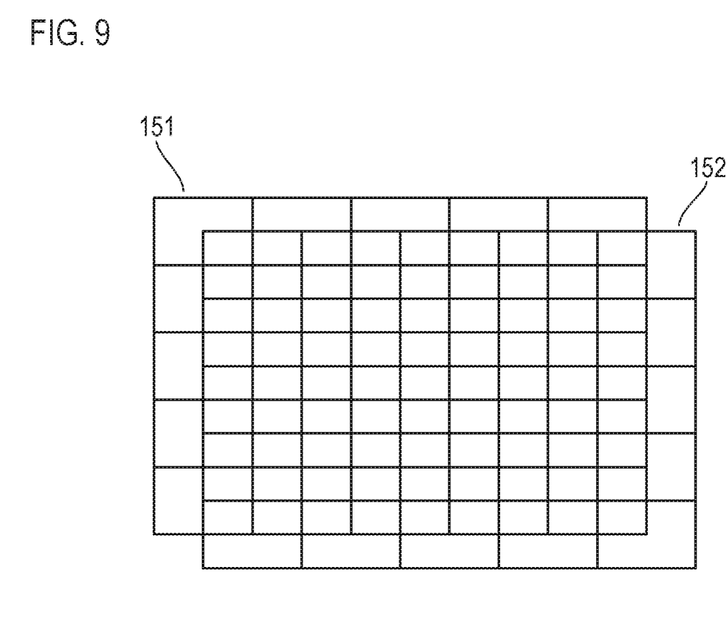
FIG. 9 is a diagram illustrating two grid patterns that have rectangular unit cells and are overlaid on one another.
Figure 10:
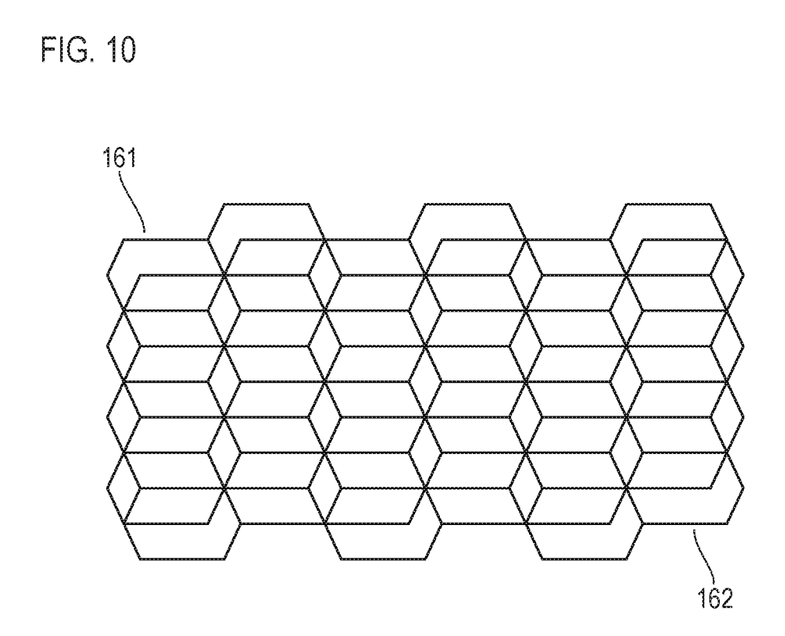
FIG. 10 is a diagram illustrating two grid patterns that have horizontally long hexagonal unit cells and are overlaid on one another.

FIG. 9 illustrates grid patterns 151, 152 that have rectangular unit cells and are overlaid on each other. FIG. 10 illustrates grid patterns 161, 162 that are overlaid on one another and have unit cells each of which is a horizontally long hexagon that is enclosed with three pairs of opposite sides parallel to each other but in which the distance between one of the pairs of sides is narrow.

Unit cells having various shapes as illustrated in FIGS. 9 and 10 can be provided by applying graphics transformation (1) or (2) given below to square or regular-hexagonal unit cells or a grid pattern comprising such unit cells.

(1) Graphics transformation that elongates or contracts unit cells in any one direction in a plane (2) Graphics transformation that transforms unit cells by applying coordinate values of points in a figure in a first oblique coordinate system arbitrarily defined in a plane to a second oblique coordinate system that has an angle between coordinate axes that differs from that of the first oblique coordinate system For example, the operation of (1) transforms a square to a rectangle, a rhombus shape, or a parallelogram and the operation of (2) transforms a square to a rhombus shape. The operation of (1) or (2) transforms a regular hexagon to a hexagon enclosed with three pairs of opposite sides parallel to each other but with different distances between two opposite sides.

While each of the unit grid cells descried above has a shape that has four or six vertices connected by sides that are straight lines to enclose the interior of the shape, a unit cell may have a shape that has four or six vertices connected by sides that are curves or include curves and straight lines to enclose the interior of the shape.

A unit cell that has such a shape can be produced by applying the operation of (3) given below to a square or regular-hexagonal unit cell.

(3) Replacing line segments of opposite sides parallel to each other with lines that include identical curves or combinations of curves and straight lines.

Figure 11:
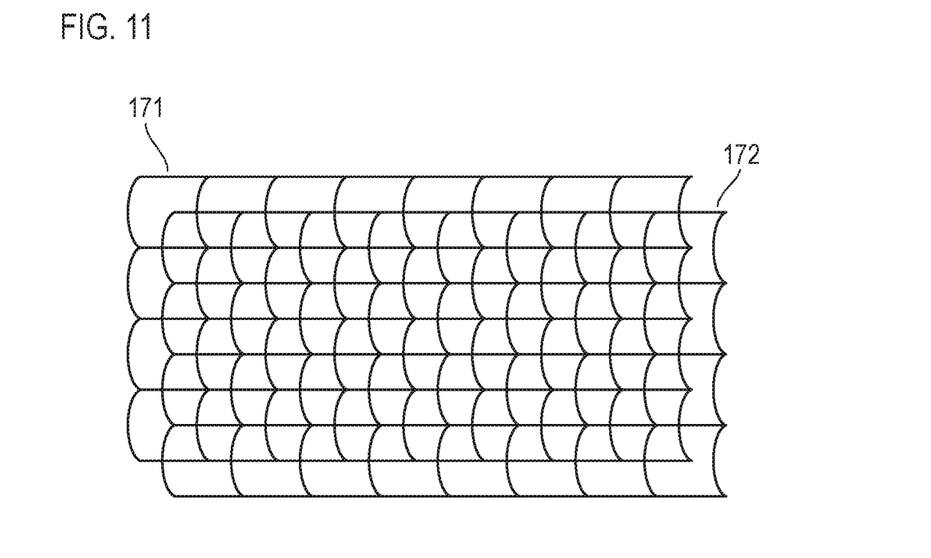
FIG. 11 is a diagram illustrating two grid patterns that are overlaid on one another and have unit cells each having four vertices interconnected by straight lines and curves.
Figure 12:
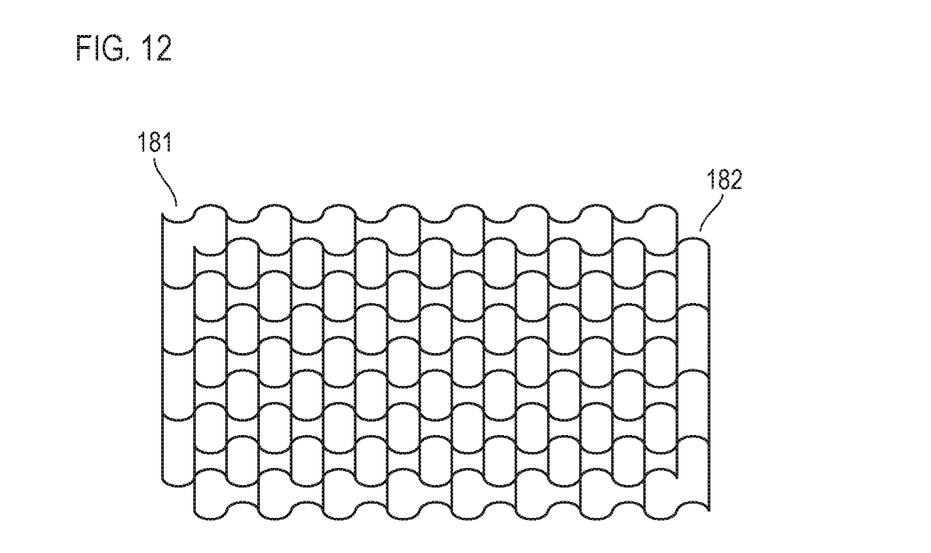
FIG. 12 is a diagram illustrating two grid patterns that are overlaid on one another and have unit cells each having four vertices interconnected by straight lines and curves.
Figure 13A:
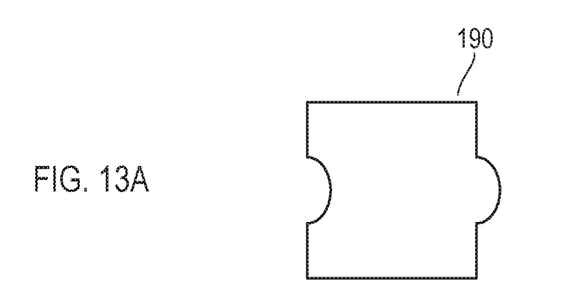
FIG. 13A is a diagram illustrating an example shape of a unit cell.
Figure 13B:
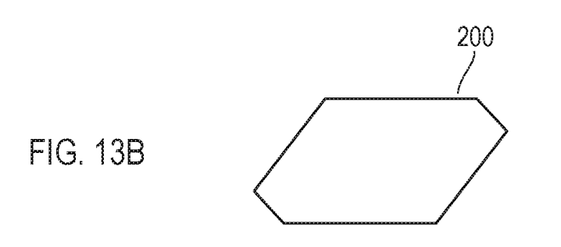
FIG. 13B is a diagram illustrating an example shape of a unit cell.

FIG. 11 illustrates grid patterns 171, 172 that have unit cells resulting from the operation of (3) applied to square unit cells and are overlaid on one another. FIG. 12 also illustrates grid patterns 181, 182 that have unit cells resulting from the operation of (3) applied to square unit cells and are overlaid on one another. FIG. 13A further illustrates an example shape of a unit cell 190 resulting from the operation of (3) applied to a square unit cell and FIG. 13B further illustrates an example shape of a unit cell 200 resulting from the operation of (1) applied to a regular-hexagonal unit cell.

Unit cells of one type that can be tiled by a translation operation in accordance with a pair of tiling periodicity directions that are nonparallel to each other and translational periods corresponding thereto or a grid pattern made up of such unit cells can also be produced by performing a combination of the operations of (1) to (3) given above.

It should be noted that the shape of the unit cell of the first mesh pattern and the shape of the unit cell of the second mesh pattern do not necessarily need to be identical to each other, provided that their tiling periodicity directions and translational periods of their unit cells are identical. For example, the unit cells of the second mesh pattern may be unit cells produced by applying the operation of (3) described above to the unit cells of the first mesh pattern.

The first mesh pattern formed in the first layer 62 and the second mesh pattern formed in the second layer 64 have been described above. Each of the first mesh pattern and the second mesh pattern is located in the entire sensor region 20 so as to eliminate contrast in the sensor region 20 as described above. In the touch panel having a layer configuration illustrated in FIG. 6A, the first sensor electrode 70 and the second dummy wiring 110 overlap one another with the insulating layer 63 between them and, similarly, the second sensor electrode 100 and the first dummy wiring 80 overlap one another with the insulating layer 63 between them.

Connection parts between the second sensor electrode 100 formed in the second layer 64 and first leads 52 that are formed in the first layer 62 and located in a frame region disposed around the sensor region 20 will be described next.

Figure 14:
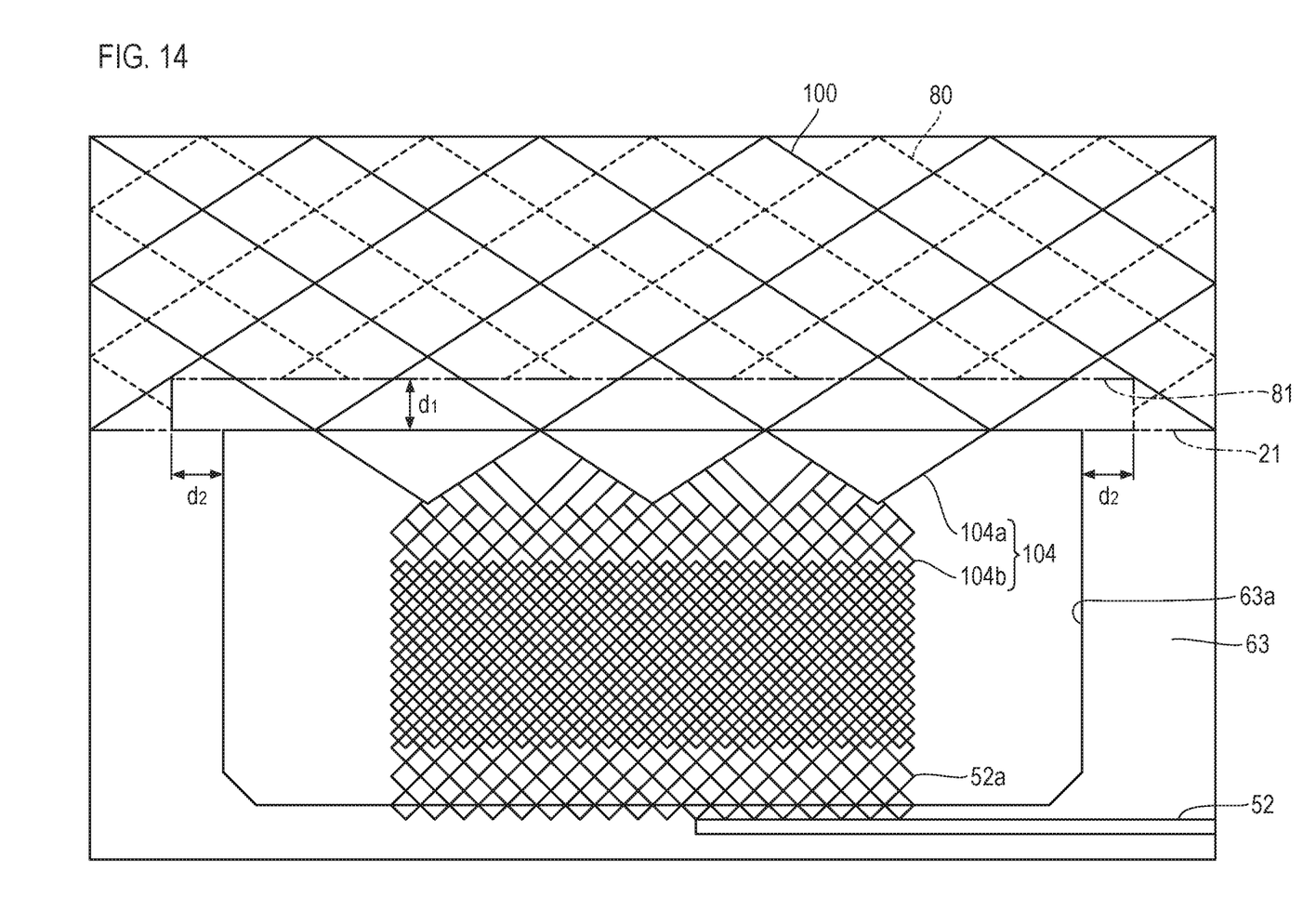
FIG. 14 is a partial enlarged view of a portion in which a second sensor electrode is connected to a first lead in an example embodiment of a touch panel according to the present invention.

FIG. 14 illustrates the connection part. The first connection part 52a in the form of a dense mesh of fine lines is formed at an end of the first lead 52. On the other hand, an extension part 104 is extendedly formed at an end edge of the second sensor electrode 100. The extension part 104 in this example comprises a large mesh part 104a which is an extension of the mesh that constitutes the second sensor electrode 100, and a small mesh part 104b which is further extendedly formed from the large mesh part 104a. The small mesh part 104b is a dense mesh of fine lines and the small mesh part 104b and the first connection part 52a of the first lead 52 have the same mesh structures with square unit cells.

A first through hole 63a is formed in the insulating layer 63 and the first connection part 52a of the first lead 52 and the extension part 104 of the second sensor electrode 100 are located in the first through hole 63a and in electrical contact with each other, thereby connecting the first lead 52 to the second sensor electrode 100. It should be noted that the first connection part 52a and the small mesh part 104b which have the same mesh structures are aligned with and overlaid on one another in such a way that they deviate by ½ pitch (½ of a period) from perfect alignment with each other in this example as illustrated in FIG. 14.

On the other hand, a first recess 81, which is a cut in the mesh of fine lines in this example, is formed at a marginal edge of the first dummy wiring 80 (indicated by dashed lines in FIG. 14) which overlap the second sensor electrode 100 with the insulating layer 63 between them. The marginal edge of the first dummy wiring 80 is separated away from the first through hole 63a by the first recess 81. The provision of the first recess 81 can avoid a problem that is caused by contact of the first dummy wiring 80 with the second sensor electrode 100.

Specifically, if the first dummy wiring 80 runs off the marginal edge of the insulating layer 63, that is, protrudes into the first through hole 63a and electrically contacts the extension part 104 of the second sensor electrode 100 due to print misalignment or bleed in printing of the first layer 62, the insulating layer 63 and the second layer 64, an undesirable significant change will occur in the capacitance of the second sensor electrode 100 that has come into contact with the first dummy wiring 80. The provision of the first recess 81 in the first dummy wiring 80 that separates the marginal edge of the first dummy wiring 80 away from the first through hole 63a produces a gap having a size that is equivalent to the dimensions of the first recess 81 that ensures insulation, thereby avoiding electrical contact between the first dummy wiring 80 and the second sensor electrode 100 and consequently preventing a problem such as a change in the capacitance of the second sensor electrode 100 even if print misalignment or bleed smaller than or equal to the dimensions occurs in printing. Note that the dimensions $d_1$, $d_2$ of the first recess 81 illustrated in FIG. 14 are chosen to be approximately 160 μm, for example.

Figure 15:
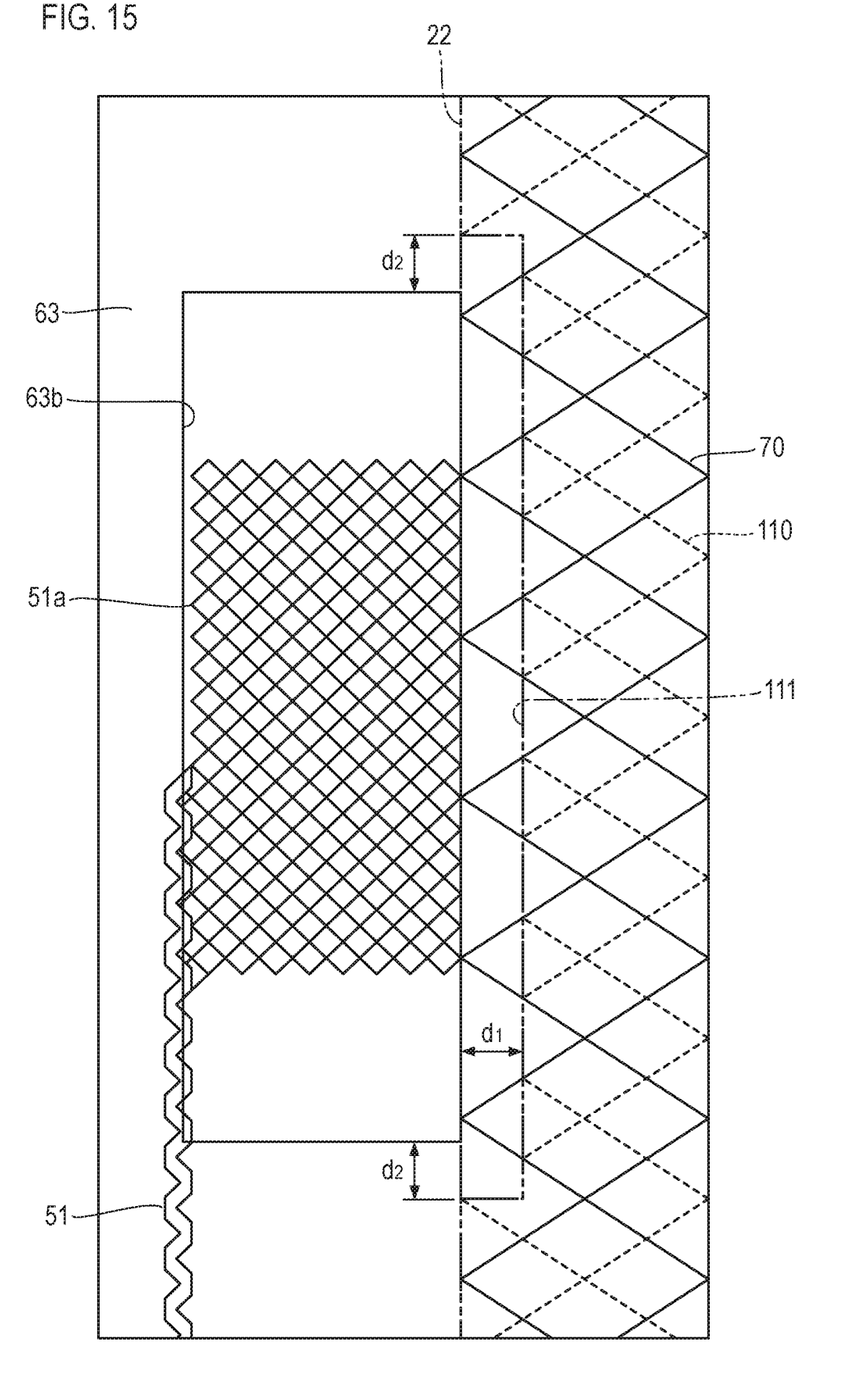
FIG. 15 is a partial enlarged view of a portion in which a first sensor electrode is connected to a second lead in an example embodiment of a touch panel according to the present invention.

FIG. 15 illustrates a connection part between the first sensor electrode 70 and a second lead 51. A second connection part 51a in the form of a dense mesh of fine lines like the first connection part 52a of the first lead 52 is formed at an end of the second lead 51 and the first sensor electrode 70 and the second lead 51 are interconnected through the second connection part 51a.

The first sensor electrode 70, the second lead 51 and the second connection part 51a are formed in the same first layer 62 and therefore the second connection part 51a will be covered with the insulating layer 63. If the second connection part 51a coupled to an end edge of the first sensor electrode 70 is used as an inspection pad for performing electrical inspection of the first sensor electrode 70, a second through hole 63b that exposes the second connection part 51a is formed in the insulating layer 63 as illustrated in FIG. 15. In this case, a problem like the problem in the connection part between the second sensor electrode 100 and the first lead 52 described previously can occur. To prevent such a problem, a second recess 111 that separates the marginal edge of the second dummy wiring 110 (indicated by dashed lines in FIG. 15) which overlap the first sensor electrode 70 with the insulating layer 63 between them away from the second through hole 63b is formed at a marginal edge of the second dummy wiring 110.

The provision of the second recess 111 as described above can prevent a problem such as a change in the capacitance of the first sensor electrode 70 which would otherwise be caused by electrical contact of a second dummy wiring 110 protruding into the second through hole 63b due to printing misalignment or bleed with the second connection part 51a. Note that the dimensions $d_1$, $d_2$ of the second recess 111 illustrated in FIG. 15 are the same as the dimensions of the first recess 81.

It should be noted that if a recess where there is no mesh of fine lines exists at a marginal edge of the first dummy wiring 80 or the second dummy wiring 110, in other words, at a marginal edge of the first mesh pattern or the second mesh pattern as described above, the recess is preferably located outside the sensor region, that is, the marginal edge of the sensor region is preferably set inwardly from the recess.

What is claimed is:

1. A touch panel comprising:
a first sensor electrode in a form of a mesh of fine lines formed in a first layer;
a first dummy wiring in a form of a mesh of fine lines formed in a region in the first layer other than a region in which the first sensor electrode is formed, the first dummy wiring being insulated from the first sensor electrode;
a second sensor electrode in a form of a mesh of fine lines formed in a second layer; and
a second dummy wiring in a form of a mesh of fine lines formed in a region in the second layer other than a region in which the second sensor electrode is formed, the second dummy wiring being insulated from the second sensor electrode;
wherein the first layer and the second layer are overlaid on one another with a transparent insulator disposed between the first layer and the second layer;
the first sensor electrode and the first dummy wiring, being disposed so that a first gap is formed therebetween, constitute a first mesh pattern, the first mesh pattern being a single continuous periodic mesh pattern, such that a fine line included by the first mesh pattern is interrupted at a place where the fine line included by the first mesh pattern intersects with the first gap;
the second sensor electrode and the second dummy wiring, being disposed so that a second gap is formed therebetween, constitute a second mesh pattern, the second mesh pattern being a single continuous periodic mesh pattern, such that a fine line included by the second mesh pattern is interrupted at a place where the fine line included by the second mesh pattern intersects with the second gap;
each of the first mesh pattern and the second mesh pattern is a grid pattern that is obtained by a tessellation of a plane using a unit cell of one type as a tile in accordance with a pair of tiling periodicity directions, the pair of tiling periodicity directions being nonparallel to each other, such that each of the pair of tiling periodicity directions defines a direction in which a translational period of the unit cell corresponding to the tiling periodicity direction occurs;
the first mesh pattern and the second mesh pattern are identical to each other in the pair of tiling periodicity directions and the translational periods corresponding thereto; and
the first mesh pattern and the second mesh pattern are aligned with each other and overlaid on each other in such a way that the first mesh pattern and the second mesh pattern are deviated from each other in both of the pair of tiling periodicity directions, respectively by from ¼ to ¾, inclusive, of the translational period corresponding to the tiling periodicity direction.

2. The touch panel according to claim 1,
wherein the first mesh pattern and the second mesh pattern are aligned with each other and overlaid on each other in such a way that the first mesh pattern and the second mesh pattern are deviated from each other in both of the pair of tiling periodicity directions, respectively by ½ of the translational period corresponding to the tiling periodicity direction.

3. The touch panel according to claim 2,
wherein the unit cell has a shape having four or six vertices connected by sides enclosing an interior of the shape, each of the sides being selected from the group consisting of a straight line, a curve and a combination thereof.

4. The touch panel according to claim 3,
wherein the unit cell has a rhombus shape.

5. The touch panel according to claim 3,
wherein the unit cell is a square.

6. The touch panel according to claim 3,
wherein the unit cell is a regular hexagon.

7. The touch panel according to claim 1,
wherein the unit cell has a shape having four or six vertices connected by sides enclosing an interior of the shape, each of the sides being selected from the group consisting of a straight line, a curve and a combination thereof.

8. The touch panel according to claim 7,
wherein the unit cell has a rhombus shape.

9. The touch panel according to claim 7,
wherein the unit cell is a square.

10. The touch panel according to claim 7,
wherein the unit cell is a regular hexagon.

11. The touch panel according to claim 1,
wherein the first layer and the second layer are printed wirings formed on one side of a transparent substrate with the transparent insulator as an insulating layer disposed between the first layer and the second layer.

12. The touch panel according to claim 11,
wherein the one side of the transparent substrate is divided into a sensor region and a frame region disposed around the sensor region, such that the first mesh pattern and the second mesh pattern are located in the sensor region;
a first lead provided with a first connection part is formed in the first layer, the first lead being located in the frame region;
an extension part is extendedly formed at an end edge of the second sensor electrode;
a first through hole is formed in the insulating layer, such that
the extension part and the first connection part are connected to each other within the first through hole; and
a first recess is formed at a marginal edge of the first mesh pattern, such that the first mesh pattern is separated away from the first through hole by the first recess.

13. The touch panel according to claim 12,
wherein the first recess is formed in the first dummy wiring.

14. The touch panel according to claim 12,
wherein a second lead provided with a second connection part is formed in the first layer, the second lead being located in the frame region;
an end edge of the first sensor electrode and the second connection part are connected to each other;
a second through hole is formed in the insulating layer, such that the second connection part is exposed through the second through hole; and
a second recess is formed at a marginal edge of the second mesh pattern, wherein the second mesh pattern is separated away from the second through hole by the second recess.

15. The touch panel according to claim 14,
wherein the second recess is formed in the second dummy wiring.

16. The touch panel according to claim 11,
wherein the one side of the transparent substrate is divided into a sensor region and a frame region disposed around the sensor region, such that the first mesh pattern and the second mesh pattern are located in the sensor region;
a second lead provided with a second connection part is formed in the first layer, the second lead being located in the frame region;
an end edge of the first sensor electrode and the second connection part are connected to each other;
a second through hole is formed in the insulating layer, such that the second connection part is exposed through the second through hole; and
a second recess is formed at a marginal edge of the second mesh pattern, wherein the second mesh pattern is separated away from the second through hole by the second recess.

17. The touch panel according to claim 16,
wherein the second recess is formed in the second dummy wiring.

18. The touch panel according to claim 1,
wherein the first layer and the second layer are printed wirings formed on one side and the other side, respectively, of the transparent insulator as a substrate.

* * * * *